3,028,384
DIHYDROQUINOXALONE-(2) DERIVATIVES AND
PROCESS OF PREPARING SAME
Hugo Zellner, Linz (Danube), and Mathias Pailer and Gerfried Pruckmayr, Vienna, Austria, assignors to Donau-Pharmazie Gesellschaft m.b.H., Linz (Danube), Austria, a company of Austria
No Drawing. Filed June 30, 1960, Ser. No. 39,807
Claims priority, application Austria July 3, 1959
7 Claims. (Cl. 260—247.2)

The present invention relates to novel derivatives of dihydroquinoxalone-(2) and to a process of preparing same, and particularly to derivatives of 3-benzyl dihydroquinoxalone-(2).

It is one object of the present invention to provide new and valuable derivatives of dihydroquinoxalone-(2) which compounds have proved to be of strong analgesic activity.

Another object of the present invention is to provide a simple and effective process of making such new and valuable derivatives of dihydroquinoxalone-(2).

A further object of the present invention is to provide valuable analgesic compositions comprising derivatives of dihydroquinoxalone-(2).

Still another object of the present invention is to provide a method of relieving pain by administering such derivatives of dihydroquinoxalone-(2).

Other objects of the present invention and advantageous features thereof will become apparent as the description proceeds.

It has been found that certain derivatives of 3-benzyl dihydroquinoxalone-(2) have a strong analgesic effect comparable to that of morphine. This pharmacological effect is conditioned on the presence of a basic substituent radical attached to the nitrogen atom adjacent the keto group of the dihydroquinoxalone ring. The quaternary ammonium compounds derived from such basic dihydroquinoxalone-(2) compounds of this invention have also excellent analgesic effects.

In one aspect of this invention, the novel dihydroquinoxalone-(2) compounds may be described by the formula

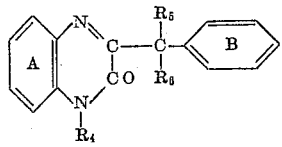

In said formula
$R_4$ is an alkyl radical substituted by an amino group which may be a primary, secondary, or tertiary amino group substituted by alkyl radicals or wherein the nitrogen atom may be the nitrogen atom of a heterocyclic radical, such as a dialkylamino alkyl group, an amino alkyl group, an alkyl-N-piperidyl group, or an alkyl-N-morpholinyl group, and the like; while
$R_5$ and $R_6$ are hydrogen, a lower alkyl radical, the hydroxyl group, an acyloxy group, an alkoxy group, the amino group, an acylamino group, a monoalkylamino group, and a dialkylamino group; and wherein the benzene rings A and/or B may be substituted by halogen, alkyl radicals, hydroxyl groups, alkoxy groups, acyloxy groups, amino groups, monoalkylamino groups, dialkylamino groups, acylamino groups, nitro groups, or thioalkyl groups, ring A containing not more than three of such substituents and ring B not more than two of such substituents.

The alkyl radicals in said benzene rings A and/or B may be the same or different alkyl radicals and may be lower or higher, straight-chain or branched alkyl radicals. The length of the alkyl chain is not critical. As a practical matter, however, the alkyl chain will contain no more than 5 carbon atoms. Among the alkyl radicals that may be present in rings A and/or B are: methyl; ethyl; n-propyl; iso-propyl; n-butyl; iso-butyl; tert-butyl; n-pentyl.

Halogen in said rings A and/or B may be chlorine, bromine, iodine, or fluorine. They may be attached directly to a carbon atom of a benzene ring, or they may be connected to a carbon atom of a substituent alkyl radical as enumerated above. For practical purposes, chlorine and bromine are preferred, but iodine and fluorine are not excluded.

The alkoxy groups present in rings A and/or B consist of an oxygen atom and of one of the alkyl radicals enumerated above or of higher alkyl radicals such as the hexyloxy, 2,2-dimethyl hexyloxy, n-octyloxy, n-decyloxy, n-hexadecyloxy groups. When rings A and/or B are substituted by acyloxy groups, these groups may be derived from acetic, propionic, n-butyric, n-valeric, trimethyl acetic, caproic, diethyl acetic, cyclopentane carboxylic, 5-methyl hexanoic, ethyl propyl acetic, cyclohexane carboxylic, ethyl-n-butyric, ethyl isobutyric, cyclohexyl acetic, decanoic, palmitic, stearic, and other aliphatic and alicyclic acids. Acyloxy groups derived from aromatic or heterocyclic mono - or dicarboxylic acids such as benzoic acid, phenyl acetic acid, o-, m-, or p-toluic acid, hydrocinnamic acid, o- and p-tolyl acetic acid, 3,4-dimethyl benzoic acid, phenyl butyric acids, m- and p-ethyl phenyl acetic acid, 2,4,6-trimethyl benzoic acid, 1-indene carboxylic acid, 5-indane carboxylic acid, 2-phenyl pentanoic acid, 2-methyl-3-phenyl butanoic acid, α-naphthoic acid, β-naphthoic acid, 2- and 3-furoic acid, tetrahydro-2-furoic acid, 3-thiophene carboxylic acid, picolinic acid, nicotinic acid, isonicotinic acid, piperidine-4-carboxylic acid, hexahydronicotinic acid, 2-thenyl malonic acid, 3-indol acetic acid, malonic acid, succinic acid, glutaric acid, methylsuccinic acid, adipic acid, pimelic acid, suberic acid; also tetradecane-1, 14-dicarboxylic acid, cyclohexyl malonic acid, trans - decahydronaphthyl malonic acid, phthalic acid, therephthalic acid, phenyl malonic acid, phenyl succinic acid, and other acids.

Olefinic acids are also capable of furnishing acyloxy radicals suitable for the purposes of this invention, and the wide variety of such olefinic acids includes crotonic, 2-pentenoic acid, 3-pentenoic acid, allyl acetic acid, citraconic acid, muconic acid, 7-octenoic acid, undecylenic acid, oleic acid, and the alkoxy and halogenated substitution products of the acids enumerated.

The alkylamino and acylamino groups in rings A and/or B correspond to the formula

wherein $R_9$ and $R_{10}$ may be the same or different radicals, and may be hydrogen, lower or higher alkyl radicals, or acyl groups. When $R_9$ and/or $R_{10}$ are alkyl radicals they may be any of the alkyl radicals enumerated above. When $R_9$ and/or $R_{10}$ are acyl groups, these radicals and groups are derived from the acids from which the aforementioned acyloxy groups are derived.

When rings A and/or B are substituted by a thioalkyl group, a sulfur atom connected to one of the carbon atoms of said benzene rings carries one of the aforeenumerated alkyl radicals.

When the substituent $R_4$ represents a dialkylamino alkyl group, the alkyl radicals may be the same or different, and are among those alkyl radicals enumerated above.

When $R_4$ is a monoalkylamino alkyl group, the nitrogen atom carries a hydrogen atom, and the alkyl radicals are the same as those present in the aforementioned dialkylamino alkyl groups.

The substituents $R_5$ and $R_6$ may be the same alkyl radicals as enumerated above; preferably they do not have more than five carbon atoms.

When they are acyloxy, alkoxy, acylamino, mono- or dialkylamino groups, these groups are selected among those enumerated above.

Although a number of dihydroquinoxalone derivatives are known, 3-benzyl dihydroquinoxalone-(2) derivatives which carry a basic radical on the nitrogen atom in 1-position have heretofore not been disclosed. These compounds, as a class, have outstanding analgesic effects which are possessed both by the basically substituted 3-benzyl dihydroquinoxalones-(2) and by their quaternary ammonium compounds. Their analgesic activity is very high and quite similar to that of morphine.

The known substituted quinoxalines, quinoxalinium compounds, and 1,2-dihydroquinoxalone-(2) compounds which have been produced heretofore, in contrast to the new 3-benzyl substituted 1,2-dihydroquinoxalone-(2) compounds, exhibit a pronounced tonicizing effect on the isolated frog heart which effect is similar to that of the heart glycosides, but they do not have any analgesic effect.

Likewise, known 1-dialkylamino alkyl-3-methyl-1,2-dihydroquinoxalones-(2), i.e., compounds which carry in 3-position a methyl radical, in place of the benzyl radical, do not have any analgesic effect.

The novel compounds can be produced by the following methods, but the invention is not limited to compounds produced by any of these described specific methods.

METHOD I

An o-diamine including the o-phenylenediamine is reacted with phenylpyruvic acid, substituted phenyl pyruvic acids, or their reactive derivations to form the corresponding 1,2-dihydroquinoxalone-(2) compound. This intermediate is then reacted with the reactive derivative of the corresponding amino alcohol for introducing an aminoalkyl radical in 1-position. Condensing agents, such as potassium hydroxide, sodium alcoholate, sodium amide, pyridine, or the like, can be added thereto. When one of the starting materials is o-phenylenediamine or a symmetrically di-substituted derivative of o-phenylenediamine, a single well defined compound is obtained. When monosubstituted o-phenylenediamines or o-phenylenediamins having several substituents which are different from each other or which are assymmetrically positioned at the benzene ring, are employed as the one reactant, two isomeric dihydroquinoxalone-(2) derivatives are obtained. Said isomers may be separated from each other in many instances. The following equations may illustrate these condensation reactions:

(a) $R_1$ the same as $R_2$:

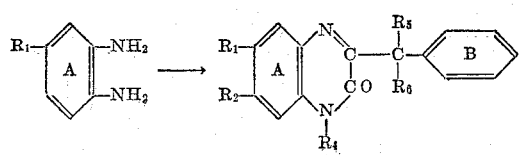

(b) $R_1$ different from $R_2$:

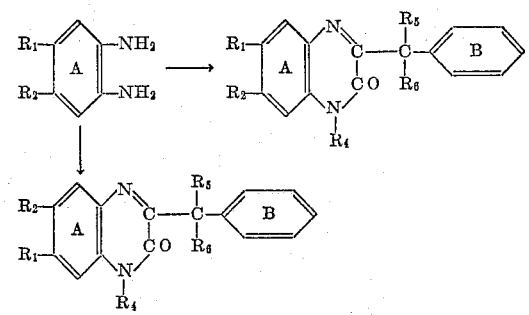

METHOD II

Phenylpyruvic acid or a reactive derivative thereof is reacted with an aromatic o-diamine, one of the nitrogen atoms which carries either the desired basic group or a radical which can readily be converted into the desired basic group. The substituent may be a dialkylamino alkyl group or an ω-hydroxy alkyl group which is readily converted to the corresponding dialkylamino alkyl group.

As distinguished from Method I, this reaction yields only one well defined dihydroquinoxalone-(2) compound regardless of the kind and position of the substituent or substituents in the benzene ring of the o-diamine, as is evident from the following equation:

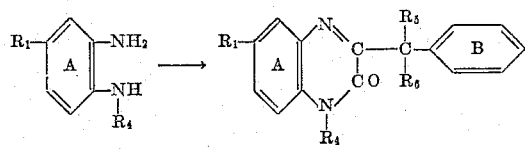

METHOD III

A reactive derivative of a phenylpyruvic acid, and preferably a halide thereof, such as the acid chloride or bromide, is reacted with an aromatic o-diamine, one nitrogen atom of which carries an amino alkyl group, an alkyl-N-piperidyl group, or an alkyl-N-morpholinyl group. Said reaction takes place smoothly and readily, and is the preferred method of preparing an analgesic compound according to this invention when the acid halide of the respective phenylpyruvic acid can be distilled without decomposition.

METHOD IV

If suitably substituted aromatic o-diamines are not readily available or cannot conveniently be prepared, the following method is preferred:

The amino nitrogen atom of a suitably substituted o-nitraniline is amino alkylated and the resulting secondary amine is reacted with a phenylpyruvic acid compound or its reactive derivative such as its acid halide to form the corresponding anilide. The nitro group is subsequently reduced by means of hydrogen and a catalyst, by iron and acetic acid, by means of ammonium sulfide, or the like. Ring closure of the resulting o-diamino anilide to the quinoxaline ring takes place thereby. Other amino groups which may be present in the starting material in positions other than the o-position, do not participate in the ring closure reaction.

This method is particularly convenient in the case of compounds the reduction of which may lead to more than one product. It permits easy separation of the resulting mixture of reaction products. This will be apparent from the following diagram of consecutive reactions of a 2,4-dinitro-5-amino benzene compound, the amino nitrogen atom of which is first amino alkylated and then reacted with a phenylpyruvic acid compound to form the corresponding anilide, whereupon only one of the nitro groups is reduced. Only reduction of the nitro group adjacent the anilide nitrogen atom leads to formation of a dihydroquinoxalone-(2) ring:

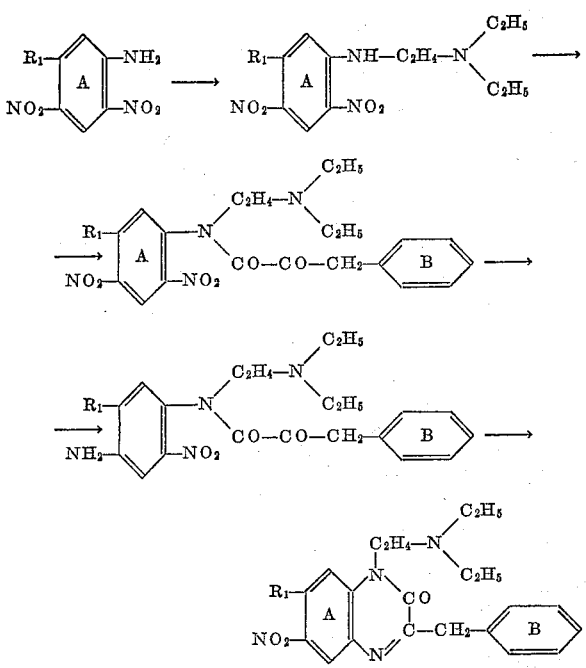

METHOD V

N-substituted aromatic o-diamines such as dialkylamino alkylated o-phenylenediamines may be reacted with glycidic acid esters to form, as intermediate compound, amino acid esters which need not be isolated, but which may further be treated with dilute sulfuric acid to form directly the corresponding tetrahydroquinoxalone-(2) compounds. Treating said compounds with oxidizing agents such as potassium ferricyanide and the like causes dehydrogenation to the corresponding dihydroquinoxalones-(2) according to the following equation:

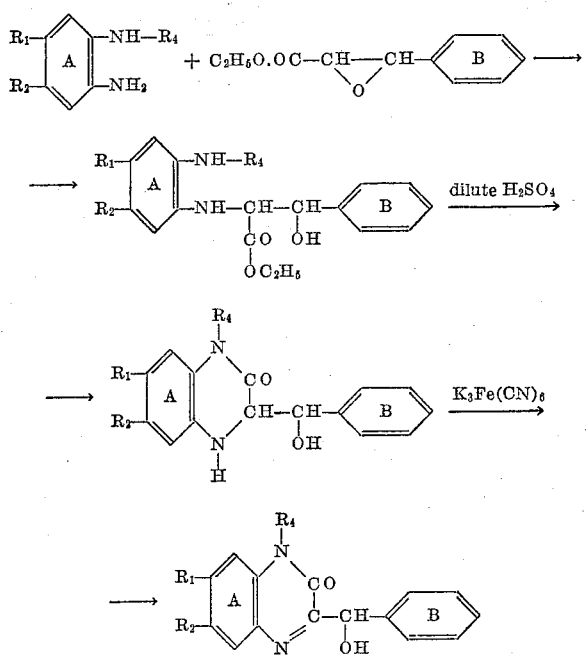

The following examples are further illustrative of the present invention, and it will be understood that the invention is not limited thereto:

Example 1

1-(DIETHYLAMINO ETHYL)-3-BENZYL DIHYDROQUINOXALONE-(2)

9 g. of phenyl pyruvic acid are dissolved in 50 cc. of ethanol. The solution is mixed with a solution of 10 g. of N-diethylamino ethyl-o-phenylenediamine in a small amount of alcohol. The combined solutions are refluxed for 30 minutes. The o-(β-diethylamino ethylamino)-anilide of phenyl pyruvic acid precipitates as a white solid, but is not isolated. The alcohol is evaporated on a water bath in the vacuum of a water jet pump and the residue is further heated to 100° C. for ⅓ hour. Water is split off and ring closure takes place. The resulting viscous oil is dissolved in hydrochloric acid (1:1) and the solution is repeatedly shaken with ether. The ether extracts are discarded. The aqueous phase is then made alkaline by the addition of ammonia and is extracted with methylene chloride. The extract is dried and the solvent is distilled off. The residue is distilled in a vacuum of 0.01 mm. Hg by heating in an air bath to about 100° C. 13 g. of 1-(diethylamino ethyl)-3-benzyl dihydroquinoxalone-(2) (80% of the theoretical yield) are obtained. The compound has a melting point of 31° C.

Example 2

1-(DIETHYLAMINO ETHYL)-3-(p-METHOXY BENZYL)-DIHYDROQUINOXALONE-(2)

10 g. of methoxy phenyl pyruvic acid are dissolved in 50 cc. of ethanol and the solution is combined with a solution of 10 g. of N-diethylamino ethyl-o-phenylenediamine in a small amount of alcohol. The resulting mixture is refluxed for 30 minutes, and then heated in a vacuum to 100° C. for an additional period of 30 minutes. A viscous brown oil is obtained and is dissolved in hydrochloric acid (1:1). The aqueous acid solution is repeatedly washed with ether, made ammoniacal by the addition of ammonia, and extracted twice with methylene chloride. The extract is dried, the solvent is evaporated, and the residue is distilled in a vacuum of 0.01 mm. Hg. Yield: 14 g. corresponding to 80% of the theoretical yield. Boiling point 202° C./0.01 mm. Hg.; melting point after repeated recrystallization from isopropanol 69° C.

The hydrochloride melts at 188° C.

Example 3

1-(DIETHYLAMINO ETHYL)-3-(3,4-DIMETHOXY BENZYL)DIHYDROQUINOXALONE-(2)

12 g. of 3,4-dimethoxy phenyl pyruvic acid are suspended in 100 cc. of ethanol. The suspension is combined with a solution of 10 g. of N-diethylamino ethyl-o-phenylenediamine in a little ethanol. The suspended acid dissolves instantaneously and the temperature of the mixture rises slightly. The solution is refluxed for 30 minutes. The ethanol is then evaporated in the vacuum of a water jet jump. The residue is heated to 100° C. in a vacuum for 30 minutes to cause ring closure. The resulting reaction product is dissolved in hydrochloric acid (1:1) and the solution is extracted with ether. Upon concentration of the aqueous solution the hydrochloride of the desired base often precipitates. It is recrystallized from isopropanol. The purified compound melts at 192° C. On making the aqueous solution ammoniacal by the addition of ammonia and extracting the same with methylene chloride, the crude base is extracted. The methylene chloride solution is dried and the solvent is distilled off. The oily residue is distilled at 220° C. 0.01 mm. Hg. The yield is 17 g. (85% of the theoretical amount).

Example 4

1-(DIETHYLAMINO ETHYL)-3-(3,4-METHYLENEDIOXY BENZYL)DIHYDROQUINOXALONE-(2)

12 g. of (3,4)-methylenedioxy phenyl pyruvic acid are suspended in 100 cc. of ethanol and a solution of 10 g. of N-diethylamino ethyl-o-phenylenediamine in a little ethanol is added thereto. Thereby, the temperature of the mixture increases slightly and a clear solution is obtained. Said solution is refluxed as described in Example 3 above, the solvent is removed, and the residue is heated at 100° C. in a vacuum to cause ring closure. The hydrochloride of the desired base is precipitated by the addition of hydrochloric acid (1:1). On recrystallization from isopropanol, it melts at 220° C. The base is obtained by extraction of its ammoniacal aqueous solution with methylene chloride. It is purified by vacuum distillation at an air bath temperature of 220° C. in a vacuum of 0.01 mm. Hg. It is a light yellow viscous oil. Yield 17 g. (85% of the theoretical yield).

Example 5

1-(DIETHYLAMINO ETHYL)-3-(3,4-DIMETHOXY BENZYL)-6-CHLORO DIHYDROQUINOXALONE-(2)

55.3 g. of 2-diethylamino ethylamino-5-chloro aniline are dissolved in 530 cc. of methanol. 47 g. of 3,4-dimethoxy phenyl pyruvic acid are added. The mixture is refluxed for three hours. The methanol is distilled off and the residue is heated for one hour to 110–120° C. in the vacuum of a water jet pump. A very viscous oily yellow residue is obtained which is dissolved in benzene. The benzene solution is repeatedly shaken in a separatory funnel with hydrochloric acid (1:1). The resulting combined acid extracts are filtered through charcoal and then made ammoniacal by the addition of ammonia. The aqueous solution containing the desired base is repeatedly extracted with benzene. The benzene extracts are combined, dried by means of anhydrous sodium sulfate, and evaporated to dryness. The free base is obtained as a highly viscous, almost colorless oil which boils at 240–246° C./0.5 mm. Hg.

Example 6

1-(DIETHYLAMINO ETHYL)-3-(3,4-DIMETHOXY BENZYL)-6 (OR 7-)-CHLORO DIHYDROQUINOXALONE-(2)

32.5 g. of 4-chloro-o-phenylenediamine are dissolved in 80 cc. of absolute ethanol. The solution is refluxed with 45 g. of 3,4-dimethoxy phenyl pyruvic acid. A clear solution is formed at first. After approximately 30 minutes, precipitation of crystals sets in. Refluxing is continued for additional 90 minutes. The mixture is cooled to room temperature and the crystals are filtered off by suction. They are washed with ethanol and recrystallized from dioxane. The purified 3-dimethoxy benzyl-6 (or 7-)-chloro dihydroquinoxalone-(2) has a melting point of 202° C.

Said dihydroquinoxalone-(2) compound is dispersed in 250 cc. of absolute ethanol. A sodium ethanolate solution prepared from 3.2 g. of sodium metal and 750 cc. ethanol is added thereto. A clear solution is rapidly formed which is heated in a flask equipped with a reflux condenser, while 19 g. of freshly distilled diethylamino ethylchloride are added drop by drop. Vigorous reaction sets in and sodium chloride precipitates. Heating is continued for one hour. The reaction mixture is cooled to room temperature, and the precipitated sodium chloride is removed from the liquid by filtration. The solvent is then distilled off. A viscous sirupy residue remains and is dissolved in benzene while heating gently. The solution is repeatedly shaken in a separatory funnel with hydrochloric acid (1:1). A small amount of unreacted 3-dimethoxy benzy-6 (or 7-)-chloro dihydroquinoxalone-(2) separates and is removed by filtration. It is purified by recrystallization.

The combined aqueous extracts are made ammoniacal by the addition of ammonia and are twice extracted with small amounts of benzene. The benzene solution is dried with anhydrous sodium sulfate and evaporated to dryness. The remaining base is obtained as a very viscous, light yellow oil which has a boiling point between 245° C. and 250° C./0.6 mm. Hg to 0.7 mm. Hg. The yield is 33.5 g. The resulting two position-isomeric dihydroquinoxalones-(2) cannot be separated by distillation.

Example 7

1-(DIETHYLAMINO ETHYL)-3-(3,4-DIMETHOXY BENZYL)-6 (OR 7-)-CHLORO DIHYDROQUINOXALONE-(2)

The procedure described in Example 6 can be simplified in the following manner:

32.5 g. of 4-chloro-o-phenylenediamine and 45 g. of 3,4-dimethoxy phenyl pyruvic acid are refluxed in 80 cc. of absolute ethanol for 2 hours. 3-dimethoxy benzyl-6 (or 7-)-chloro dihydroquinoxalone-(2) partly crystallizes. A sodium alcoholate solution prepared from 5.7 g. of sodium and 800 cc. of absolute ethanol is added to the reaction mixture. A clear solution forms which is heated to boiling in a flask equipped with a reflux condenser while 31 g. of diethylamino ethylchloride are added drop by drop. The resulting mixture is worked up as described in Example 6 and yields 98.5 g. of the dihydroquinoxalone-(2) base, corresponding to an overall yield of 80%.

Example 8

1-(DIETHYLAMINO ETHYL)-3-(p-NITRO BENZYL) DIHYDROQUINOXALONE-(2)

54 g. of p-nitro phenyl pyruvic acid and 35 g. of N-diethylamino ethyl-o-phenylenediamine in 200 cc. of absolute ethanol are refluxed for one hour. The ethanol is distilled off and the residue is heated in a vacuum on a water bath. The resulting reaction product is dissolved in hydrochloric acid (1:1). The solution is filtered over charcoal to remove resinous by-products. It is then made ammoniacal by the addition of ammonia and is extracted four times with dichloroethane. The solvent solution is dried over anhydrous sodium sulfate and the solvent is distilled off. The residue is distilled in a vacuum. Its boiling point is 175° C./0.2 mm. Hg. Yield after four times repeated distillation: 16 g. of a reddish yellow oil, $n_D = 1,549$.

Example 9

1-(DIETHYLAMINO ETHYL)-3-(p-ETHOXY BENZYL) DIHYDROQUINOXALONE-(2)

20.7 g. of diethylamino ethyl-o-phenylenediamine and 20.8 g. of p-ethoxy phenyl pyruvic acid in 250 cc. of ethanol are refluxed for one hour. The alcohol is distilled off and the residue is heated in a vacuum at a bath temperature of 150° C. to 160° C. for 2 hours. The resulting product is distilled twice in a vacuum of 0.1 mm. to 0.2 mm. Hg. The distilled oil is triturated with isopropanol to induce crystallization. The crystals melt at 62° C. The yield is 32 g.

The same compound is prepared by reacting equivalent amounts of o-phenylenediamine with p-ethoxy phenyl pyruvic acid in the manner described in Example 6, to form 3-(p-ethoxy benzyl)dihydroquinoxalone-(2) (melting point: 195° C.). Said compound is further reacted with diethylamino ethylchloride in xylene in the presence of potassium carbonate. This method yields 75% of the calculated amount of 1-(diethylamino ethyl)-3-(p-ethoxy benzyl)dihydroquinoxalone-(2).

Example 10

1-(DIETHYLAMINO ETHYL)-3-(p-DIMETHYLAMINO BENZYL)DIHYDROQUINOXALONE-(2)

20.7 g. of diethylamino ethyl-o-phenylenediamine and 20.7 g. of p-dimethylamino phenyl pyruvic acid in 250 cc. of ethanol are refluxed for two hours. The ethanol is then distilled off and the residue is heated in a vacuum at a bath temperature of 150° C. to 160° C. for one hour. The remaining base is dissolved in dichloro methane and extracted with dilute hydrochloric acid. The aqueous hydrochloric acid solution is made ammoniacal by the addition of ammonia and is again extracted with dichloro methane. The extract is dried. The solvent is distilled off. The residue is twice distilled in a vacuum. A light yellow oil having a boiling point of 212° C./0.1 mm. Hg (air bath) is obtained.

*Example 11*

1-(DIETHYLAMINO ETHYL)-3-(p-CHLORO BENZYL) DIHYDROQUINOXALONE-(2)

108 g. of o-phenylenediamine and 198 g. of p-chloro phenyl pyruvic acid in 500 cc. of 96% ethanol are refluxed for one hour. Shortly thereafter whitish-yellow needle-shaped crystals precipitate from the solution. The alcohol is distilled off and the solid residue is heated in a vacuum to a bath temperature of 150° C. for 90 minutes to complete ring closure. The resulting reaction product is repeatedly recrystallized from a mixture of dioxane and water (1:1). 230 g. of 3-p-chloro benzyl dihydroquinoxalone-(2) are obtained in the form of white needles having a melting point of 180° C.

90 g. of said p-chloro benzyl dihydroquinoxalone-(2) and 90 g. of diethylamino ethylchloride in 300 cc. of xylene are refluxed for 8 hours in the presence of 90 g. of potassium carbonate. The hot solution is filtered and cooled. Some unreacted starting material precipitates and is removed by filtration by suction. Xylene is distilled off and the residue is repeatedly distilled in a vacuum. 1-(diethylamino ethyl)-3-(p-chloro benzyl)dihydroquinoxalone-(2) is obtained in the form of a colorless oil boiling at 225° C./0.3 mm. Hg.

*Example 12*

1-(DIETHYLAMINO ETHYL)-3-(p-METHOXY BENZYL)-6-(OR 7-)-METHYL DIHYDROQUINOXALONE-(2)

122 g. of 3,4-diamino toluene and 194 g. of p-methoxy phenyl pyruvic acid in 1000 cc. of ethanol are refluxed for five hours. Crystals promptly start precipitating. The alcohol is distilled off and the residual cake of crystalline material is heated in a vacuum in an oil bath to a bath temperature of 140° C. for four hours. The reaction product is repeatedly recrystallized from ethanol. The purified 3-(p-methoxy benzyl)-6-(7)-methyl dihydroquinoxalone-(2) forms white crystals melting at 200–203° C.

82 g. of 3-p-methoxy benzyl-6-(7)-methyl dihydroquinoxalone-(2) and 80 g. of diethylamino ethylchloride in 250 cc. of xylene are refluxed with 80 g. of potassium carbonate for 12 hours. The solution is filtered and the solvent is distilled off. The residue is distilled in a vacuum. 1-(diethylamino ethyl)-3-(p-methoxy benzyl)-6-(7)-methyl dihydroquinoxalone-(2) is obtained as a yellowish red oil of the boiling point 205° C./0.05 mm. Hg. Said oil crystallizes slowly. On recrystallization from a small amount of isopropanol, white crystals are obtained. Yield: 58 g. Melting point 70° C.

*Example 13*

1-(DIETHYLAMINO ETHYL)-3-(p-METHOXY BENZYL)-6-(OR 7)-METHOXYQUINOXALONE-(2)

13.8 g. of 3,4-diamino anisol are dissolved in 100 cc. of ethanol. An ethanolic solution of 19.4 g. of p-methoxy phenyl pyruvic acid is added thereto and the mixture is heated under reflux on the water bath for one hour. The solvent is distilled off and the residue is heated in a vacuum in an oil bath at a bath temperature of 150–160° C. for two hours. The reaction product is recrystallized from a mixture of ethanol and dioxane (10:1). The resulting mixture of the two isomeric (3,4-p-methoxy benzyl)-6-(or 7)-methoxy dihydroquinoxalones-(2) melts at 190° C. The yield is 90% of the theoretical yield.

29.6 g. of said base mixture are dispersed in 250 cc. of xylene. 14.5 g. of diethylamino ethylchloride and 4.5 g. of finely powdered sodium amide are added. The reaction mixture is heated on a water bath with stirring for 3 hours. It is then filtered and extracted with dilute hydrochloric acid. The aqueous acid extract is made ammoniacal by the addition of ammonia. A light oil separates and is taken up in dichloro methane. The solvent is distilled off and the residue is purified by double distillation in a vacuum. 1-(diethylamino ethyl)-3-(p-methoxy benzyl)-6-(7)-methoxy dihydroquinoxalone-(2) is obtained in the form of a yellow oil which boils at 210° C./0.1 mm. Hg.

When employing equivalent amounts of phenyl pyruvic acid and of 3,4-dimethoxy phenyl pyruvic acid in place of p-methoxy phenyl pyruvic acid, and proceeding as described hereinabove, there are obtained the following compounds:

3-benzyl-6-(7)-methoxy dihydroquinoxalone-(2) (melting point: 185° C.);
3 - (3,4-dimethoxy benzyl)-6-(7)-methoxy dihydroquinoxalone-(2) (melting point: 170° C.).

These compounds yield the following final products:

1-(diethylamino ethyl)-3-benzyl-6(7)-methoxy dihydroquinoxalone-(2);
1-(diethylamino ethyl)-3-(3,4-dimethoxy benzyl)-6(7)-methoxy dihydroquinoxalone-(2): Yellow oil boiling at 220° C./0.3 mm. Hg.

*Example 14*

1-(DIETHYLAMINO ETHYL)-3-(p-METHOXY BENZYL)-6(7)-CHLORO DIHYDROQUINOXALONE-(2)

300 g. of p-methoxy phenyl pyruvic acid are dissolved in 700 cc. of hot 96% ethanol. 220 g. of 4-chloro-1,2-diamino benzene are dissolved in 800 cc. of 96% ethanol and the solution is filtered through charcoal. The two solutions are combined and are boiled on the water bath under reflux for 30 minutes. The ethanol is distilled off and the residue is heated in an oil bath to 110° C. for 30 minutes. The whitish grey crystals formed thereby are filtered off by suction, and washed with ethanol. They are repeatedly recrystallized from dioxane and finally twice from glacial acetic acid whereby the two isomers are separated. Their respective melting points are 227–229° C. and 212–216° C. The total yield is 143 g.

150 g. of the fraction of the melting point 227–229° C. are refluxed with 135 g. of diethylamino ethylchloride in 500 cc. of xylene in the presence of 138 g. of finely pulverized potassium carbonate for two days. The xylene solution is filtered by suction, the solvent is distilled off, and the residue is distilled in a vacuum. 178 g. of a very viscous red oil of the boiling point 240–242° C./0.6 mm. Hg are obtained. Upon redistillation, the oil boils at 228° C./0.3 mm. Hg.

On triturating the oil with isopropanol, crystallization is induced. The crystals are twice recrystallized from isopropanol and melt at 78–79° C. The yield is 104 g.

When employing 3-(p-methoxy benzyl)-6-(or 7)-chlorodihydroquinoxalone-(2) and β-morpholino ethylchloride there is obtained 1-(morpholinoethyl)-3-(p-methoxybenzyl)-6-(or 7)-chlorodihydroquinoxalone-(2).

31 g. 3-(p - methoxybenzyl)-6-(or 7)-chlorodihydroquinoxalone-(2) (produced from 1,2-diamino-4-chlorobenzene and p-methoxy phenylpyruvic acid according to the procedure described above) and 4.5 g. finely powdered sodium amide are refluxed with 15.5 g. β-morpholino ethylchloride in 100 ml. dioxane for one hour. The solution is cooled and added to 50 ml. of a 40% solution of sodium hydroxide in water. The dioxane layer is separated and the aqueous solution is extracted twice with dioxane obtained from the aqueous layer. The dioxane extracts are combined by means of potassium carbonate and evaporated to dryness. The oily residue is distilled in vacuo. The base boils in the range between 200–210° C. (measured in air-bath) at 0.01 mm. Hg and crystallizes after some days.

In a similar manner as described above 1-(morpholino ethyl)-3-(3,4-methylenedioxybenzyl)-6-(or 7) - methoxy dihydroquinoxalone-(2) has been obtained. Melting point after recrystallization from isopropanol 200° C.

Example 15

1-(MORPHOLINO ETHYL)-3-(p-METHOXY BENZYL) DIHYDROQUINOXALONE-(2)

p-Methoxy benzyl dihydroquinoxalone-(2) is produced from o-phenylenediamine and p-methoxy phenyl pyruvic acid according to the procedure described in Example 6. 26.6 g. of said compound are refluxed with 15.5 g. of morpholino ethylchloride and 20 g. of potassium carbonate in 250 cc. of xylene for 8 hours. The xylene solution is filtered while still hot. The solvent is distilled off and the residual oil is triturated with isopropanol to induce crystallization. The crystals are repeatedly recrystallized from isopropanol. The purified crystals are light yellow and have a melting point of 151° C.

When phenyl pyruvic acid and dimethoxy phenyl pyruvic acid, respectively, are reacted with o-phenylenediamine, the corresponding 3-benzyl- and 3-(3,4-dimethoxy benzyl)-1-(morpholino ethyl) dihydroquinoxalones-(2) are obtained. Boiling ranges 200° C./0.02 mm. Hg respectively 205–210° C./0.01 mm. Hg.

Example 16

1-(DIETHYLAMINO ETHYL) -3-[α-HYDROXY-α-(p-METHOXY PHENYL)ETHYL]TETRAHYDROQUINOXALONE-(2)

168 g. of 3-p-methoxy phenyl-3-methyl-2,3-glycidic acid ethyl ester of the formula

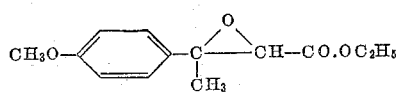

and 148 g. of diethylamino ethyl-o-phenylenediamine in 500 cc. of absolute ethanol are refluxed for 9 hours. The ethanol is then distilled off. The residue is dissolved in hydrochloric acid (1:1), and the aqueous acid solution is washed by shaking with toluene. The aqueous hydrochloric acid solution is made ammoniacal by the addition of ammonia and the base is extracted with toluene. The toluene is distilled off and the residue is refluxed with 3500 cc. of 2 N sulfuric acid for 20 minutes. The acid solution is allowed to stand overnight and is then rendered alkaline by the addition of ammonia. The base is extracted by means of toluene. The toluene extract is dried. After distilling off the toluene, an oily residue is obtained and is distilled three times in a vacuum. 84 g. of a light yellow oil having a boiling point of 210–220° C./0.1 mm. Hg (air bath) are obtained. The oil has the following structure:

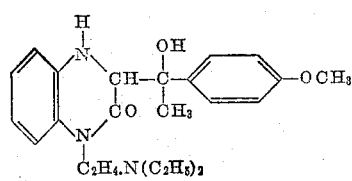

It may be converted to the corresponding dihydro compound by oxidation in aqueous solution with potassium ferricyanide.

Example 17

1-(DIETHYLAMINO ETHYL)-3-(p-METHOXY BENZYL) DIHYDROQUINOXALONE-(2)-IODO METHYLATE 18 g. of 1-(diethylamino ethyl)-3-(p-methoxy benzyl) dihydroquinoxalone-(2) produced as described in Example 2 are dissolved in 50 cc. of acetone. 14 g. of methyliodide are added thereto and the solution is refluxed for 20 hours. Thereafter, the solvent is distilled off together with unreacted methyliodide. The residue is repeatedly recrystallized from absolute ethanol. 19 g. of the iodo methylate are obtained in the form of whitish yellow crystals of the melting point 178–180° C.

In place of methyliodide used as quaternizing agent in Example 17, there may be employed other quaternizing agents such as other alkyl halogenides, for instance, methylchloride, ethyliodide, dimethylsulfate, p-toluene sulfonic acid ethyl esters, and the like. The procedure is the same as described in said Example 17.

Example 18

HYDROCHLORIDE OF 1-DIETHYLAMINO ETHYL-3-p-METHOXYPHENYL DIHYDROQUINOXALONE-(2)

To a solution of 365.5 g. 1-diethylamino ethyl-3-p-methoxybenzyl dihydroquinoxalone-(2) in 1,500 ml. isopropanol (free of water) are slowly added with stirring and cooling in an ice-bath 200 ml. of a 5 N HCl in absolute ethanol. After standing in an ice-box for five hours white crystals are separated by suction with the aid of a Büchner-funnel and washed with 300 ml. of isopropanol. The combined mother liquors are evaporated to a volume of about 400 ml. and cooled again. A second fraction of crystals is obtained. The combined crystal fractions are cleaned by recrystallization from isopropanol.

After working up the mother liquors 365 g. white needles having a melting point of 188° C. are obtained.

The new 3-benzyl dihydroquinoxalone-(2) bases are preferably employed in the form of their pharmaceutically acceptable non-toxic acid addition salts with inorganic acids such as the hydrochlorides, hydrobromides, sulfates, nitrates, phosphates, or with organic acids such as acetic acid, propionic acid, succinic acid, malonic acid, maleic acid, fumaric acid, citric acid, malic acid, tartaric acid, ascorbic acid, gluconic acid, lactic acid, benzoic acid, salicylic acid, phthalic acid, nicotinic acid, isonicotinic acid, furoic acid, and others. The acid addition salts are prepared by either dissolving the base in a suitable solvent wherein the acid addition salt is not soluble, adding thereto the equivalent amount of the respective acid, and distilling off the solvent, or by mixing the base with the required amount of acid, or in any other suitable manner.

The new analgesic agents according to the present invention are preferably administered orally in the form of tablets, dragees, pills, powders enclosed in gelatin capsules. They may also be injected in the form of their aqueous solutions.

Oral administration in liquid form, such as in the form of emulsions, suspensions, sirups, and the like is also possible. These solid and liquid preparations are produced in a manner known to the art of compounding and processing pharmaceutical products whereby the conventional diluting agents, binding agents, lubricants, expanding agents, and the like excipients, such as lactose, cane sugar, dextrins, starch, talc, kaolin, magnesium hydroxide, magnesium carbonate, pectin, gelatin, agar, bentonite, stearic acid, magnesium stearate, and others are employed.

The following examples serve to illustrate such pharmaceutical preparations without, however, limiting the same thereto.

Example 19
TABLETS

|   | G. |
|---|---|
| 1-(diethylamino ethyl)-3-benzyl dihydroquinoxalone-(2) | 25 |
| Colloidal silica sold under the trademark "Aerosil" | 56 |

These two ingredients are intimately mixed with each other and the following substances are admixed thereto:

|   | G. |
|---|---|
| Corn starch | 99 |
| Milk sugar | 120 |
| Magnesium stearate | 2 |
| Gelatin | 1.5 |
| Cocoa butter | 1.5 |

The resulting mixture is compressed to 1000 tablets, each tablet weighing about 305 mg. and containing about 25 mg. of the analgesic compound.

Example 20
TABLETS

|   | G. |
|---|---|
| Hydrochloride of 1-(diethylamino ethyl)-3-(p-methoxy benzyl) dihydroquinoxalone-(2) | 15 | are intimately mixed with

|   |   |
|---|---|
| Milk sugar | 331 |
| Corn starch | 144 |
| White gelatin | 7 |
| Cocoa butter | 7 |
| Magnesium stearate | 11 |

The mixture is tabletted and yields 1000 tablets, each tablet weighing about 515 mg. and containing about 15 mg. of the analgesic compound.

Example 21
DRAGEES

The tablets obtained according to Example 18 are sugar-coated by rotating in a coating pan with sugar solution. Sugar-coating is repeated until each dragee has attained a weight of about 500 mg.

Example 22
SUPPOSITORIES 10 g. of the free base 1-(diethylamino ethyl)-3-(3,4-dimethoxy benzyl) dihydroquinoxalone-(2) are intimately mixed with 100 g. of colloidal silica sold under the trademark "Aerosil." The mixture is incorporated into 3,000 g. of a molten conventional suppository base. 1000 suppositories, each weighing 3.1 g. and containing the free base are obtained.

In place of the free base, there may be employed the hydrochloride whereby the addition of silica can be omitted.

Example 23
INJECTABLE SOLUTION 25 g. of the hydrochloride of 1-(diethylamino ethyl)-3-(3,4-methylenedioxy benzyl) dihydroquinoxalone-(2) are dissolved in 2,200 cc. of bidistilled sterilized water. The solution is filled into ampoules, each ampoule containing 2.2 cc., and the ampoules are sterilized in an autoclave at 120° C.

Injectable solutions can also be prepared by adding the respective base to an aqueous solution of the stoichiometric amount of an acid, for instance, of hydrochloric acid, nitric acid, or of an organic acid such as acetic acid, succinic acid, ascorbic acid, gluconic acid, lactic acid, maleic acid, fumaric acid, salicylic acid, and the like.

Of course, in place of the N-diethylamino ethyl-o-phenylene diamine used as the one reaction component, for instance, in Example 1, there may be employed other N-dialkylamino alkyl-o-phenylene diamine compounds such as N-dimethylamino ethyl phenylene diamine,
N-di-n-propylamino ethyl phenylene diamine,
N-di-isopropylamino ethyl phenylene diamine,
N-di-n-butylamino ethyl phenylene diamine,
N-di-isoamylamino ethyl phenylene diamine,
N-methyl ethylamino ethyl phenylene diamine,
N-diethylamino-n-propyl phenylene diamine,
N-di-n-butylamino-n-butyl phenylene diamine,
N-di-n-amylamino isopropyl phenylene diamine,
N-mono-ethylamino ethyl phenylene diamine,
N-amino ethyl phenylene diamine,
N-piperidyl ethyl phenylene diamine,
N-morpholinyl ethyl phenylene diamine,
N-pyrrolidyl ethyl phenylene diamine, and the like, or the corresponding substituted phenylene diamine compounds such as the N-substituted 4-methyl phenylene diamine,
4- or 5-chloro phenylene diamine,
4,5-dichloro phenylene diamine,
4- or 5-methoxy phenylene diamine,
4-ethoxy phenylene diamine,
4-acetoxy phenylene diamine,
4-propionyloxy phenylene diamine,
4-benzoyloxy phenylene diamine,
4-methyl mercapto phenylene diamine, and the like N-substituted phenylene diamine compounds.

The above mentioned phenylene diamine compounds which do not carry the N-dialkylamino alkyl group at one nitrogen atom of their amino groups can be used as reactants in place of 4-chloro-o-phenylene diamine in Example 6 or 7, of o-phenylene diamine in Example 11, of 4-methyl-o-phenylene diamine in Example 12, or of 4-methoxy-o-phenylene diamine in Example 13.

In place of diethylamino ethylchloride used as the one reaction component in Example 6, there may be employed other dialkylamino alkyl halogenides, such as dimethylamino ethylchloride; di-n-amylamino ethylchloride; di-isoamylamino ethyl iodide, or the correspondingly substituted methyl, n-propyl, isopropyl, n-butyl, isobutyl, isoamyl, and the like lower alkyl halogenides while otherwise the procedure is the same as described in said Example 6.

In place of the phenyl pyruvic acids used in the preceding examples, there may be employed the following phenyl pyruvic acids:

4-methyl phenyl pyruvic acid,
4-hydroxy phenyl pyruvic acid,
2-hydroxy phenyl pyruvic acid,
4-acetoxy phenyl pyruvic acid,
4-benzoyloxy phenyl pyruvic acid,
4-amino phenyl pyruvic acid,
4-monomethylamino phenyl pyruvic acid,
4-acetylamino phenyl pyruvic acid,
4-methyl mercapto phenyl pyruvic acid, and others.

In place of the p-methoxy phenyl-3-methyl-2,3-glycidic acid ethyl ester, used as the one reactant in Example 16, there may be employed other 2,3-glycidic acid esters such as 4-ethoxy phenyl-3-methyl-2,3-glycidic acid ethyl ester,
3,4-dimethoxy phenyl-3-methyl-2,3-glycidic acid ethyl ester, 3,4-methylenedioxy phenyl-3-methyl-2,3-glycidic acid ethyl ester,
4-nitro phenyl-3-methyl-2,3-glycidic acid ethyl ester,
4-chloro phenyl-3-methyl-2,3-glycidic acid ethyl ester,
4-methoxy phenyl-3-ethyl-2,3-glycidic acid ethyl ester,
phenyl-3-methyl-2,3-glycidic acid ethyl ester, and others.

The preferred and most effective compounds according to the present invention are the following compounds:

1-diethylaminoethyl-3-p-methoxy benzyl dihydroquinoxalone-(2),
1-diethylaminoethyl-3-p-dimethylaminobenzyl dihydroquinoxalone-(2),
1-diethylaminoethyl-3-p-methoxybenzyl - 6 - (or 7)-halogen quinoxalone-(2),
1-diethylaminoethyl-3-p-methoxy benzyl - 6 - (or 7)-methoxy quinoxalone-(2),
1-diethylaminoethyl - 3 - [α-hydroxy - α - (p-methoxyphenyl)-ethyl] tetrahydroquinoxalone-(2), and -dihydroquinoxalone-(2), although, of course, this invention is by no means limited thereto.

The single dose of such compounds administered to relieve pain is between about 2 mg. and about 150 mg. and preferably between about 10 mg. and about 50 mg. If required, administration is repeated every three to six hours.

Some pharmacological effects of a representative number of the novel substances are given in the following table.

METHODS OF PHARMACOLOGICAL TRIALS

*Toxicity.*—The $ED_{50}$ was graphically detected. Mice were used with a weight between 15–22 g., the substances given in the form of their hydrochlorides in aqueous solution intraperitoneally.

*Analgesic action.*—The methods of Friebel and Reichle (Arch. exper. Path. und Pharmakol., 226, page 551 (1955)) (burning test) and of Siegmund, Cadmus and Go Lu (Proc. Soc. Exp. Biol. Med., 95, page 729 (1957)) (phenylbenzochinon-test) have been used.

The $ED_{50}$ has been estimated by the method of Litchfield and Wilcoxon (J. Pharmacol. Exp. Therap. 96, page 99 (1949)).

The substances have been compared with the known analgesic action of pyramidon and morphine.

*Spasmolytic action.*—This action has been tested in the apparatus of Magnus, using the ileum of guinea pigs. As exciting substances carbaminoyl cholin chloride (C.C.C.), histamine and barium chloride, and as spasmolytic substances for comparison atropine, neo antergane and papaverine have been used.

Of course, many changes and variations in the reaction components, the reaction conditions, temperature and duration, the solvents employed, the methods of working up the reaction mixtures and of isolating and purifying the reaction products, and the like may be made by those skilled in the art in accordance with the principles set forth herein and in the claims annexed hereto.

We claim:

1. 1-(diethylamino ethyl)-3-(p-methoxy benzyl) dihydroquinoxalone-(2).
2. 1-(diethylamino ethyl)-3-(3,4-methylene dioxybenzyl) dihydroquinoxalone-(2).
3. 1-(diethylamino ethyl)-3-(p-dimethylamino benzyl)-dihydroquinoxalone-(2).
4. 1-(diethylamino ethyl) - 3 - (p-methoxy benzyl)-6-methoxy dihydroquinoxalone-(2).
5. 1-(diethylamino ethyl) - 3 - (p-methoxy benzyl)-6-chloro dihydroquinoxalone-(2).
6. 1-(morpholino ethyl)-3-(p-methoxy benzyl)dihydroquinoxalone-(2).
7. The 3-benzyl dihydroquinoxalone-(2) compounds selected from the group consisting of the 3-benzyl dihydroquinoxalone-(2) compounds of the formula

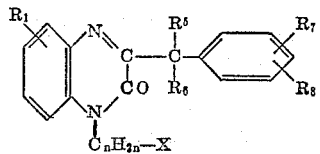

wherein $R_1$ is a member selected from the group consisting of hydrogen, lower alkyl, lower alkoxy and chlorine;
$R_5$ and $R_6$ are members selected from the group consisting of hydrogen, alkyl with 1 to 5 carbon atoms, the hydroxyl group, the amino group, lower alkanoyloxy, lower alkoxy, lower alkanoylamino, mono-(lower alkyl) amino, and di-(lower alkyl) amino;
$R_7$ and $R_8$ are members selected from the group consisting of hydrogen, lower alkoxy, chlorine, the nitro group, di-(lower alkyl) amino, and $R_7$ and $R_8$ forming the methylene dioxy group; while
$n$ is an integer from 2 to 5; and
X is a member of the group consisting of

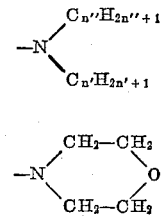

and

TABLE

| Exptl. No. | Substances | Toxicity $ED_{50}$ i.p., mg./kg. | Analgetic action, method of— | | Spasmolytic action against— | | | Relative activity |
|---|---|---|---|---|---|---|---|---|
| | | | Friebel and Reichle, relative activities | | Siegmund, Cadmus and Go Lu $ED_{50}$, oral mg./kg. | C.C.C. (Atropine-like activity) $ED_{50}$ mg./ml. | Histamine (Antihistaminic action) $ED_{50}$ mg./ml. | BaCl (papaverine-like action) | |
| | | | Oral | S.c. | | | | | |
| P 200 | 1-diethylaminoethyl-3-benzyl dihydroquinoxalone-(2). | 160 | 34 | -------- | 144 | Ca. 3.5 | -------- | -------- | -------- |
| P 201 | 1-diethylaminoethyl-3-p-methoxybenzyl dihydroquinoxalone-(2). | 146 | 100 | 100 | 46 | 2.2 | 0.17 | 0.74 | 580 |
| P 202 | 1-diethylaminoethyl - 3 - 3,4 - dimethoxybenzyl dihydroquinoxalone-(2). | 73 | 68 | -------- | 81 | 5.7 | -------- | -------- | -------- |
| P 203 | 1-diethylaminoethyl-3-(3,4)-methylene dioxybenzyl dihydroquinoxalone-(2). | 131 | 74 | -------- | 38 | 2.9 | -------- | -------- | -------- |
| | Pyramidone | -------- | 11 | -------- | -------- | -------- | -------- | -------- | -------- |
| | Morphine | -------- | -------- | 340 | -------- | -------- | -------- | -------- | -------- |
| | Atropine | -------- | -------- | -------- | -------- | 0.004 | -------- | -------- | -------- |
| | Neo antergane | -------- | -------- | -------- | -------- | -------- | 0.0013 | -------- | -------- |
| | Papaverine | -------- | -------- | -------- | -------- | -------- | -------- | 4.3 | 100 | wherein $n'$ and $n''$ are integers from 2 to 5, their pharmaceutically acceptable, non-toxic acid addition salts, and their quaternary ammonium compounds of the formula

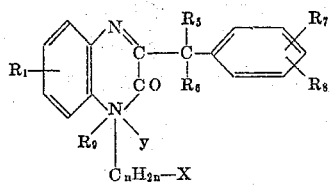

wherein $R_1$, $R_5$, $R_6$, $R_7$, $R_8$, X, and $n$ represent the same members and integers as indicated above;

$R_9$ indicates alkyl with 1 to 6 carbon atoms, and $y$ indicates a member selected from the group consisting of halogen and the alkosulfate group having 1 to 6 carbon atoms in the alkyl radical.

References Cited in the file of this patent

UNITED STATES PATENTS 2,748,117     Druey et al. _____ May 29, 1956

OTHER REFERENCES

Simpson: Chemistry of Heterocyclic Compounds (Interscience, 1953), pages 286–292.

Druey et al.: Helv. Chim. Acta., vol. 35 (1956), pages 2301–14.